(12) United States Patent
Ha et al.

(10) Patent No.: US 10,698,971 B2
(45) Date of Patent: Jun. 30, 2020

(54) METHOD AND APPARATUS FOR STORING ACCESS LOG BASED ON KEYWORD

(71) Applicant: SAMSUNG ELECTRONICS CO., LTD., Suwon-si (KR)

(72) Inventors: Sojeong Ha, Daejeon (KR); Kyoung Gu Woo, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 130 days.

(21) Appl. No.: 15/609,308

(22) Filed: May 31, 2017

(65) Prior Publication Data

US 2018/0039646 A1 Feb. 8, 2018

(30) Foreign Application Priority Data

Aug. 3, 2016 (KR) ........................ 10-2016-0099074

(51) Int. Cl.
| | | |
|---|---|---|
| *G06F 16/00* | (2019.01) | |
| *G06F 16/958* | (2019.01) | |
| *G06F 16/28* | (2019.01) | |
| *G06F 16/955* | (2019.01) | |
| *G06F 16/9535* | (2019.01) | |
| *G06F 16/2457* | (2019.01) | |

(52) U.S. Cl.
CPC ...... *G06F 16/958* (2019.01); *G06F 16/24578* (2019.01); *G06F 16/285* (2019.01); *G06F 16/955* (2019.01); *G06F 16/9535* (2019.01)

(58) Field of Classification Search
CPC ........... G06F 17/3089; G06F 17/30867; G06F 17/3053; G06F 17/3076; G06F 17/30598; G06F 16/285; G06F 16/958; G06F 16/955; G06F 16/24578
See application file for complete search history.

(56) References Cited

U.S. PATENT DOCUMENTS

| | | | |
|---|---|---|---|
| 9,152,704 B2 | 10/2015 | Oliver et al. | |
| 10,083,222 B1 * | 9/2018 | Katzer | G06F 16/285 |
| 2002/0065671 A1 * | 5/2002 | Goerz, Jr. | G06Q 10/06 705/1.1 |
| 2006/0242147 A1 * | 10/2006 | Gehrking | G06F 17/30707 |
| 2008/0065631 A1 * | 3/2008 | Baeza-Yates | G06F 16/958 |
| 2008/0082318 A1 * | 4/2008 | Kataoka | G06F 17/30669 704/9 |
| 2008/0282186 A1 * | 11/2008 | Basavaraju | G06F 3/0482 715/781 |
| 2009/0164922 A1 | 6/2009 | Phakousonh et al. | |

(Continued)

FOREIGN PATENT DOCUMENTS

| | | |
|---|---|---|
| JP | 2009-282913 A | 12/2009 |
| KR | 2000-0018146 A | 4/2000 |

(Continued)

*Primary Examiner* — Leslie Wong
(74) *Attorney, Agent, or Firm* — Cha & Reiter, LLC

(57) ABSTRACT

A method of storing an access log and an access log storing apparatus are provided. The method includes obtaining a keyword based on an input, determining a website related to the keyword based on access log information associated with a selected link, generating summary information on the determined website, and storing, in a database the summary information on the determined website and address information of the determined website.

14 Claims, 5 Drawing Sheets

(56) References Cited

U.S. PATENT DOCUMENTS

| | | | |
|---|---|---|---|
| 2010/0299603 A1 | 11/2010 | Farkas | |
| 2012/0089598 A1* | 4/2012 | Oztekin | G06F 16/9535 |
| | | | 707/723 |
| 2012/0166439 A1* | 6/2012 | Poblete | G06F 17/3089 |
| | | | 707/737 |
| 2012/0259831 A1* | 10/2012 | Wang | G06F 17/30867 |
| | | | 707/708 |
| 2012/0265736 A1* | 10/2012 | Williams | G06F 17/30731 |
| | | | 707/692 |
| 2012/0271805 A1* | 10/2012 | Holenstein | G06F 17/30876 |
| | | | 707/706 |
| 2012/0323888 A1* | 12/2012 | Osann, Jr. | G06F 17/30991 |
| | | | 707/722 |
| 2013/0254035 A1* | 9/2013 | Ramer | G06Q 30/0267 |
| | | | 705/14.62 |
| 2014/0006399 A1* | 1/2014 | Vasudevan | G06F 17/30867 |
| | | | 707/737 |
| 2014/0068011 A1* | 3/2014 | Zhang | H04L 67/20 |
| | | | 709/219 |
| 2015/0026196 A1* | 1/2015 | Liang | G06F 17/3053 |
| | | | 707/748 |
| 2015/0106157 A1* | 4/2015 | Chang | G06Q 30/0201 |
| | | | 705/7.29 |
| 2015/0186544 A1* | 7/2015 | Benedum | G06F 17/30896 |
| | | | 715/234 |
| 2016/0055490 A1* | 2/2016 | Keren | G06Q 30/00 |
| | | | 705/14.47 |
| 2016/0063016 A1* | 3/2016 | Eggleston | G06F 17/30864 |
| | | | 707/706 |
| 2016/0092959 A1* | 3/2016 | Gross | G06K 9/00671 |
| | | | 705/26.62 |
| 2016/0162591 A1* | 6/2016 | Dokania | G06F 3/0482 |
| | | | 707/738 |
| 2016/0210321 A1* | 7/2016 | Gong | G06F 16/23 |
| 2016/0321346 A1* | 11/2016 | Li | G06F 17/30598 |
| 2016/0350370 A1* | 12/2016 | Bank | G06F 16/2455 |
| 2017/0169096 A1* | 6/2017 | Tsai | G06F 16/35 |
| 2018/0189614 A1* | 7/2018 | Chen | G06F 17/2247 |

FOREIGN PATENT DOCUMENTS

| | | |
|---|---|---|
| KR | 2003-0000808 A | 1/2003 |
| KR | 2003-0071346 A | 9/2003 |
| KR | 2003-0094967 A | 12/2003 |
| KR | 2007-0037933 A | 4/2007 |
| KR | 10-1168705 B1 | 8/2012 |
| KR | 10-1236998 B1 | 2/2013 |
| KR | 10-20130073163 A | 7/2013 |
| KR | 10-1444832 B1 | 9/2014 |
| KR | 10-2015-0042079 A | 4/2015 |

\* cited by examiner

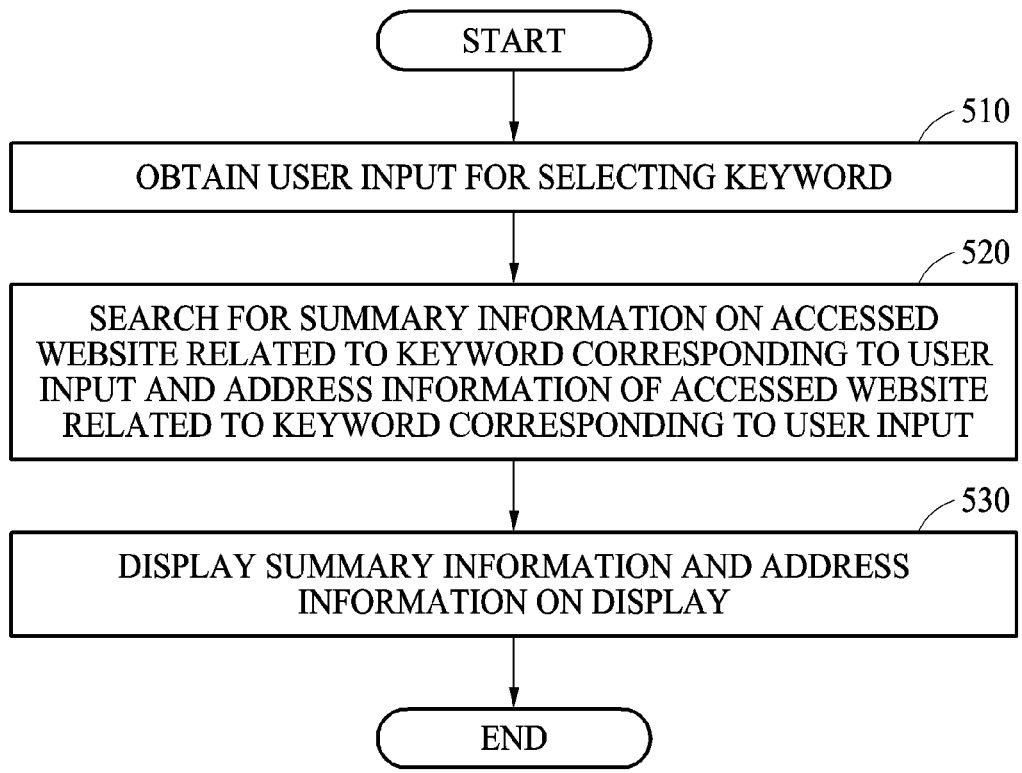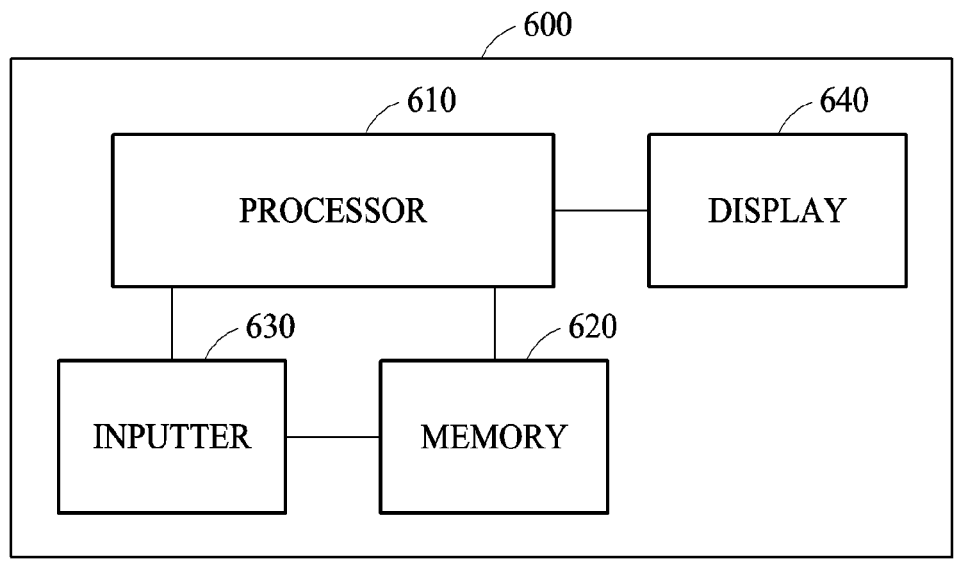

METHOD AND APPARATUS FOR STORING ACCESS LOG BASED ON KEYWORD

CROSS-REFERENCE TO RELATED APPLICATION

This application claims the benefit under 35 U.S.C. § 119(a) of Korean Patent Application No. 10-2016-0099074 filed on Aug. 3, 2016, in the Korean Intellectual Property Office, the entire disclosure of which is incorporated herein by reference for all purposes.

BACKGROUND

1. Field

The following description relates to a method and apparatus for storing an access log based on a keyword.

2. Description of Related Art

When a user searches for a specific subject by accessing websites on the Internet, an access log is generally recorded according to time. Subsequently, the user may use the access log to access a desired website related to the specific subject. However, the access log is not useful for this purpose, because most users are unable to remember the time they accessed the desired website.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of storing an access log includes obtaining a keyword based on an input, determining a website related to the keyword based on access log information associated with a selected link, generating summary information on the determined website, and storing the summary information on the determined website and address information of the determined website in a database.

The generating of the summary information may include generating summary information on websites of which a similarity is greater than or equal to a threshold value based on content in the websites related to the keyword. The generating of the summary information may include generating the summary information using an image processing engine or a natural language processing engine.

The method of storing an access log may further include determining a priority of the determined website. The determining of the priority may include generating a group including websites of which a similarity between words or images in the plurality of websites related to the keyword is greater than or equal to a threshold value, and determining a priority of the group based on a number of the websites included in the group. The determining of the priority may include determining the priority based on whether a tag is present on the website related to the keyword. The obtaining may include determining the keyword extracted from the access log information in response to the input.

The determining of the keyword may include extracting the keyword based on at least one of a number of websites related to the keyword, an amount of time used for accessing a website indicated in the access log information, or a number of times the website has been accessed as indicated in the access log information. A non-transitory computer-readable storage medium may store computer-executable instructions that, when executed, cause a processor to perform the method of storing the access log.

The input may be input from any one or any combination of a keyboard, a mouse, a touchscreen, or a voice command. The determining of the priority can include generating a group including websites of which a similarity between content in the websites related to the keyword is greater than or equal to a threshold value, and determining a priority of the group based on a degree of repetition of content on the websites included in the group.

In another general aspect, an access log storage apparatus includes at least one processor, and at least one memory configured to store instructions to be executed by the processor, wherein, in response to the instructions being executed by the processor, the instructions cause the processor to obtain a keyword based on an input, determine a website related to the keyword based on access log information associated with a selected link, generate summary information on the determined website, and store the summary information on the determined website and address information of the determined website in a database.

The generating of the summary information may include generating the summary information using an image processing engine or a natural language processing engine based on at least one instance of content in the determined website. The instructions may be further configured to cause the processor to determine a priority of the determined website.

In still another general aspect, a method of providing an access log includes obtaining an input for selecting a keyword, searching a database for summary information on an accessed website and address information of the accessed website related to the keyword corresponding to the input, and displaying, on a display, the summary information on the website and the address information of the website, wherein the summary information is generated based on at least one instance of content in the website.

A non-transitory computer-readable storage medium may store computer-executable instructions that, when executed, cause a processor to perform the method of providing the access log.

Other features and aspects will be apparent from the following detailed description, the drawings, and the claims.

BRIEF DESCRIPTION OF THE DRAWINGS

FIG. 5 is a flowchart illustrating an example of providing an access log.

FIG. 6 is a block diagram illustrating an example of an access log providing apparatus.

Throughout the drawings and the detailed description, unless otherwise described or provided, the same drawing reference numerals will be understood to refer to the same elements, features, and structures, where applicable. The drawings may not be to scale, and the relative size, proportions, and depiction of elements in the drawings may be exaggerated for clarity, illustration, or convenience.

DETAILED DESCRIPTION

Figure 1:
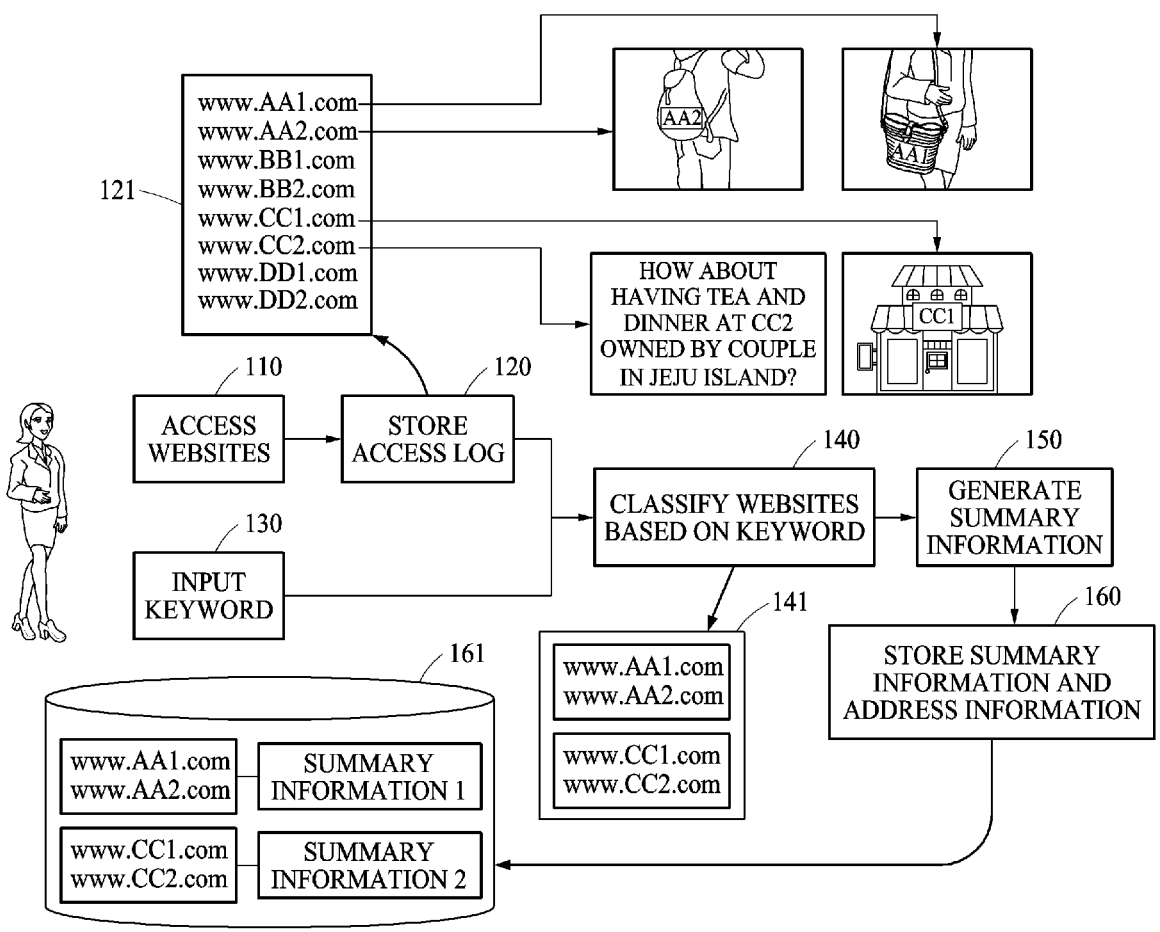
FIG. 1 illustrates an example of storing an access log.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after a full understanding of the present disclosure. The sequences of operations described herein are merely examples, and are not limited to those set forth herein, but may be changed as will be apparent after an understanding of the present disclosure, with the exception of operations necessarily occurring in a certain order. Also, descriptions of constructions that are known in the art, after full understanding of the present disclosure, may be omitted for increased clarity and conciseness.

The features described herein may be embodied in different forms, and are not to be construed as being limited to the examples described herein. Rather, the examples described herein have been provided so that this disclosure will be thorough and complete, and will convey a scope of the disclosure after an understanding of the application.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one skilled in the relevant art to which examples belong, after a full understanding of the present disclosure. It will be further understood that terms, such as those defined in commonly used dictionaries, should be interpreted as having a meaning that is consistent with their meaning in the context of the relevant art and the present disclosure and will not be interpreted in an idealized or overly formal sense, unless expressly so defined herein.

When describing examples with reference to the accompanying drawings, like reference numerals refer to like constituent elements and a repeated description related thereto will be omitted. When it is determined detailed description regarding a related configuration may make the purpose of the examples unnecessarily ambiguous in describing those examples, the detailed description will be omitted here.

FIG. 1 illustrates an example of storing an access log. An access log storage apparatus is configured to automatically store and classify an access log of websites on the Internet for each interest category of a user. When the user selects an interest category, the access log storage apparatus may store address information of websites for each interest category and summary information generated by summarizing content of websites the user previously accessed. Thus, the user may easily access a desired website among the accessed websites.

Referring to FIG. 1, in operation 110, the user may have a specified purpose and accesses a plurality of websites. For example, the user accesses the websites in a process of searching for information on performance or price of a product.

In operation 120, the access log storage apparatus stores an access log of the user in a memory or an external server. The access log may be stored in the external server by another apparatus, and the access log storing apparatus may request the stored access log. For example, access logs 121 are stored in the memory or a server.

The access log may include content such as a link of a website and a text or an image in the website. Referring to FIG. 1, the link of the website may include a keyword, for example, AA1 and AA2, selected by the user. An image in a website address, for example, www.AA1.com includes a word, for example, AA1, associated with the keyword, and for example, an image of an AA bag, input by the user. A text in a website address, for example, www.CC2.com, includes a word, for example, CC2, associated with the keyword, and for example, a name of a famous restaurant CC, input by the user.

In operation 130, the user inputs the interest category in the access log storage apparatus. In an example, the interest category of the user is provided to the access log storage apparatus through a user input. The user input may include a keyword input. The keyword may be directly input using a keyboard and a voice recognition method. The keyword may be input by selecting the keyword from among a plurality of words provided by the access log storage apparatus. For example, the user inputs the keyword, such as the name of the AA bag, and the name of the famous restaurant CC using the keyboard.

In another example, the interest category of the user may be provided to the access log storage apparatus by inputting an image. In this example, the access log storage apparatus may classify the accessed websites for each image based on a degree of relevance between the input image and the accessed websites.

The access log may be generated before or after the keyword is input. The keyword may be also input while the access log is being generated. Thus, the keyword may be input regardless of an order in which the websites are accessed.

In operation 140, the access log storage apparatus classifies the websites included in the access log based on the input keyword. For example, referring to an image 141, the access log storage apparatus classifies www.AA1.com and www.AA2.com as belonging to a same category of the AA bag determined by the word included in the content on the website or an address of a link of the website. The access log storage apparatus may classify www.CC1.com and www.CC2.com as belonging to the same category of the famous restaurant CC determined by the word included in the content on the website or the address of the link of the website.

In operation 150, the access log storage apparatus generates summary information 161 on the accessed websites. The summary information 161 may be automatically generated based on the content on the website. In operation 160, the access log storage apparatus stores the generated summary information 161 and address information in a database.

Thus, the user may easily access the websites related to a desired model of the product based on the summary information on the websites. The access log storage apparatus may reduce the effort of continuously searching for accurate information, directly adding the websites to a bookmark list, and classifying the websites in each category.

Figure 2:
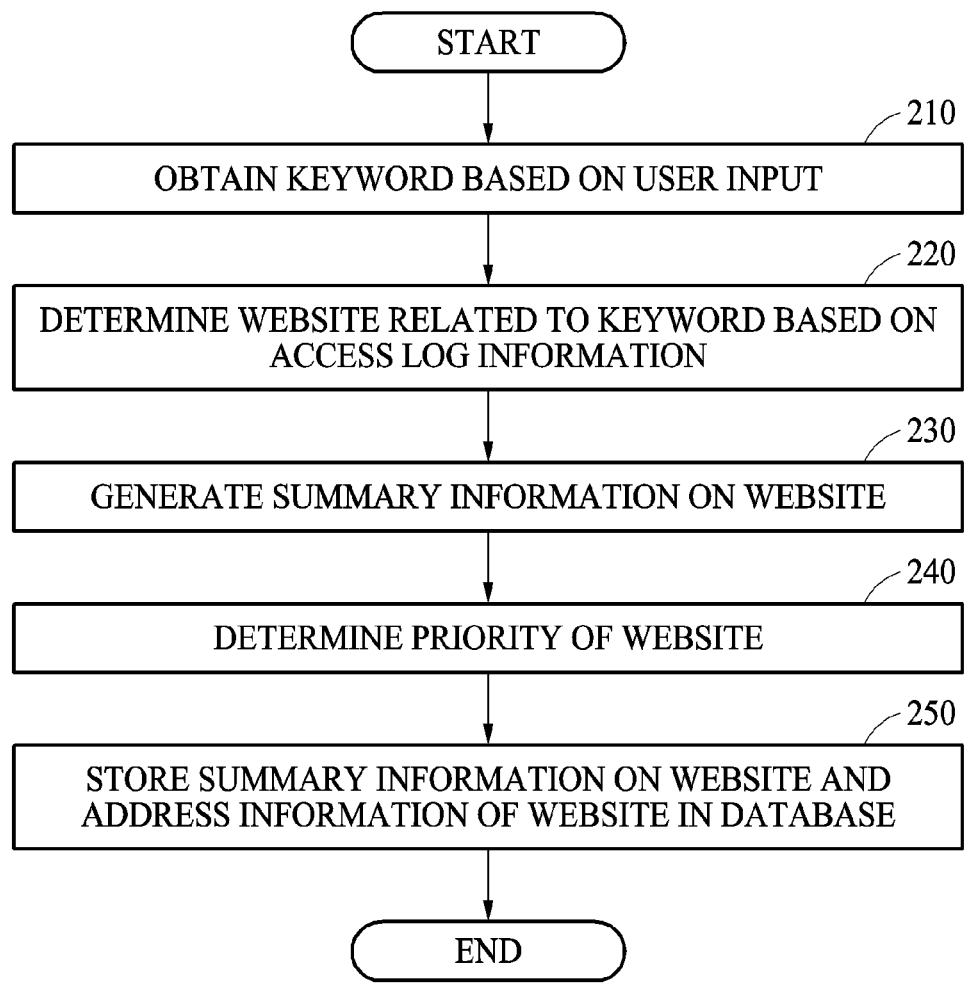
FIG. 2 is a flowchart illustrating an example of a method of storing an access log.

FIG. 2 is a flowchart illustrating an example of a method of storing an access log. In an example, in operation 210, an access log storage apparatus obtains a keyword based on a user input. For example, the keyword may be input using a keyboard or a voice. The keyword may be input by selecting the keyword from among a plurality of words provided by the access log storage apparatus.

In another example, the access log storage apparatus determines the keyword extracted from access log information in response to the user input. The access log storage apparatus may extract the keyword using content on a website based on a number of websites related to the keyword, an amount of time used for accessing the website as indicated in the access log information, or a number of times the website has been accessed as indicated in the access log information. The access log storage apparatus may provide the extracted keyword for the user, and the user may generate the user input by selecting the keyword. The access log storage apparatus may determine the keyword in response to the user input.

In operation 220, the access log storage apparatus determines a website related to the keyword based on the access log information associated with a link selected by the user. The access log storing apparatus may determine a degree of relevance between the keyword and the content on a plurality of websites and classify the websites based on the keyword in response to a result of the determining.

In operation 230, the access log storage apparatus generates summary information on the determined website. The access log storing apparatus may generate the summary information using an image processing engine or a natural language processing engine based on at least one of a word or an image in the websites. For example, the access log storage apparatus automatically recognizes the image using the image processing engine or recognizes a text using the language processing engine by verifying that the image or the text is significant, thereby including the image and the text in the summary information.

The access log storage apparatus may generate a piece of summary information on websites of which a similarity is greater than or equal to a threshold value based on the word or the image in the websites related to the keyword. Because same or similar pieces of summary information are not repeatedly provided, the access log storage apparatus enables the user to search in a simpler manner when the summary information on the websites is provided based on the keyword.

In operation 240, the access log storage apparatus determines a priority of the determined website. In an example, the access log storage apparatus determines, based on the content in the websites related to the keyword, the priority of the websites of which the similarities are greater than or equal to the threshold value. This determination is based on a number of the websites of which the similarities are greater than or equal to the threshold value. The access log storage apparatus may generate a group including websites of which similarities between words or images in the websites related to the keyword are greater than or equal to the threshold value. When a plurality of groups is generated based on the aforementioned method, the access log storage apparatus determines the priority for each group. For example, the access log storage apparatus determines the priority based on a number of websites included in the group or a degree of repetition of content on the websites included in the group.

In another example, the access log storage apparatus determines the priority based on whether a tag is present on the website related to the keyword. For example, when the user accesses the website and the website is verified to be significant, the tag is assigned to the website. An access log may include a link and tag information. The access log storage apparatus may determine that the priority of the website including the tag is relatively high, and list the website on a relatively high line when the websites are listed for each keyword.

In operation 250, the access log storage apparatus stores the summary information on the determined website and address information of the determined website in a database.

Figure 3:
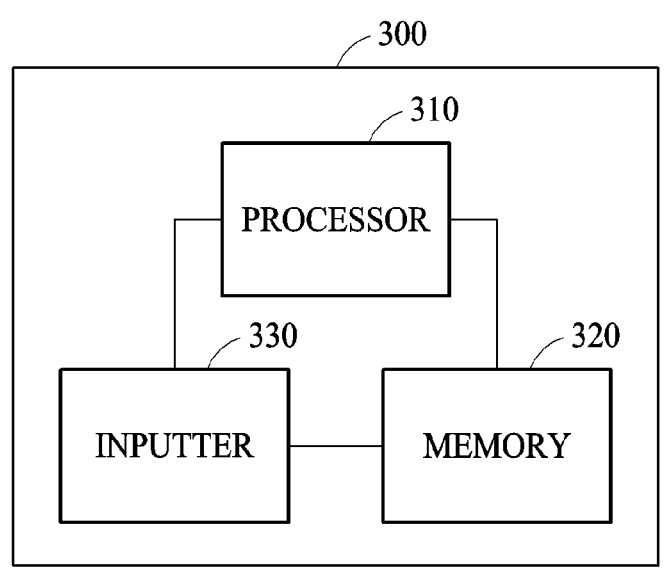
FIG. 3 is a block diagram illustrating an example of an access log storage apparatus.

FIG. 3 is a block diagram illustrating an example of an access log storage apparatus. An access log storage apparatus 300 includes a processor 310, a memory 320 configured to store instructions to be executed by the processor 310, and an inputter 330.

The inputter 330 obtains a user input of a keyword. In an example, the inputter 330 includes a keyboard input port or a voice input port. In another example, the inputter 330 includes a touch sensor when a keyword to be input is selected from among a plurality of words provided by the access log storage apparatus 300 through a touch of a user.

The memory 320 stores an access log and provides a space in which a database, including summary information and address information, is stored. The memory 320 stores the access log whenever the user accesses a website and stores the access log received from an external server.

The processor 310 performs classifying the access log for each keyword using the instructions stored in the memory 320. The processor 310 determines a website related to the keyword based on access log information associated with a link selected by the user. The processor 310 generates summary information on the determined website. Here, the processor 310 generates the summary information using an image processing engine or a natural language processing engine based on at least one of a word or an image in the website.

The processor 310 determines a priority of the determined website. The generating of the summary information and the determining of the priority may be performed in an order that is changeable, or performed simultaneously. The processor 310 stores the summary information on the determined website and the address information of the determined website in the database. The processor 310 may store the summary information and the address information in the database in an order of priority.

Figure 4:
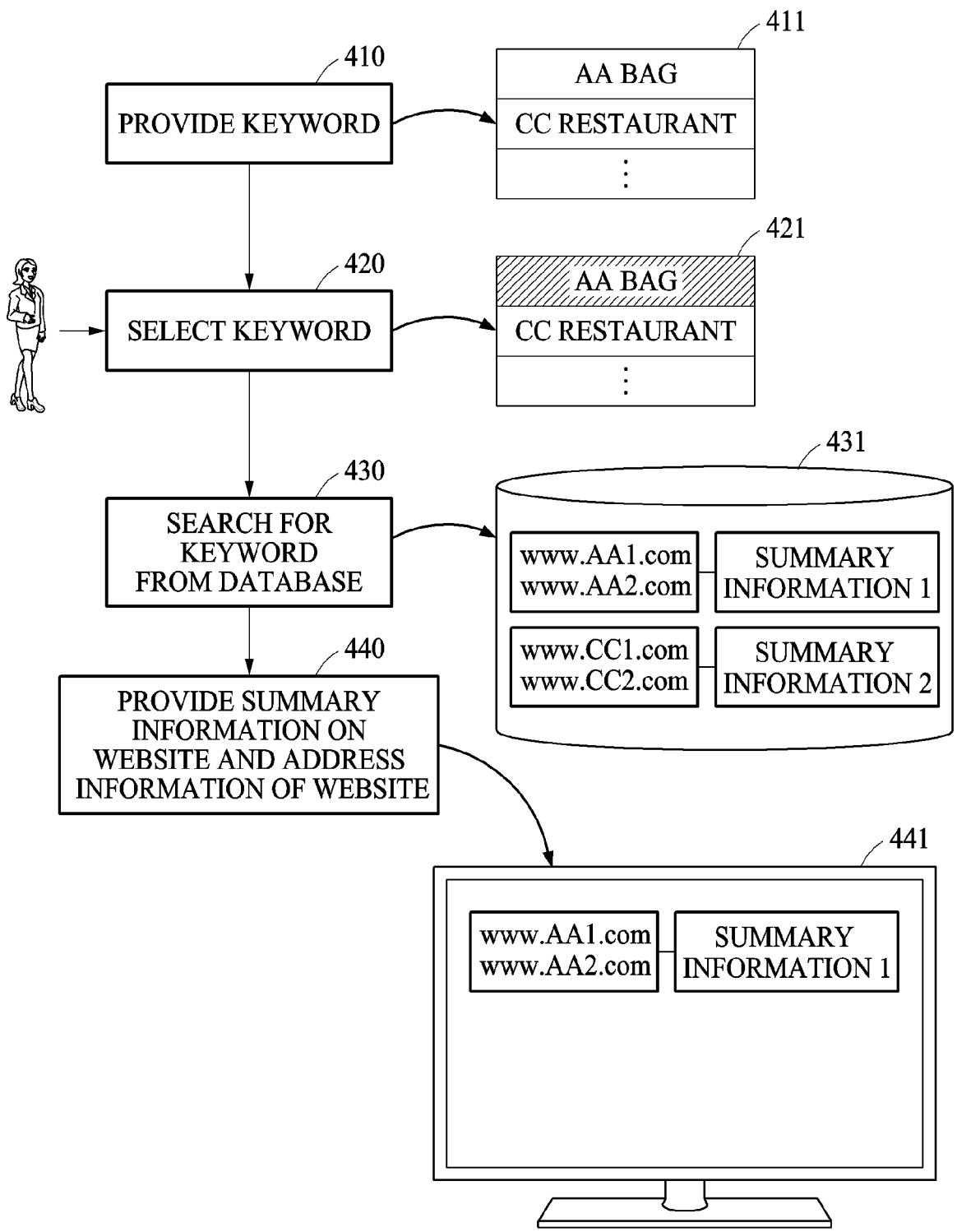
FIG. 4 illustrates an example of providing an access log.

FIG. 4 illustrates an example of providing an access log. In an example, an access log providing apparatus provides a keyword stored in a database for a user. In response to the user selecting a desired keyword, the access log providing apparatus may search for summary information on a website classified based on the keyword and address information of the website classified based on the keyword, and provide the summary information and the address information for the user. Thus, the user may easily access a desired website among websites the user previously accessed.

Referring to FIG. 4, in operation 410, the access log providing apparatus provides, for the user, a list 411 of keywords stored in the database. An access log may be provided in a visual form or an audible form. For example, the access log providing apparatus may display the list 411 on a display and provide the keyword through a speaker. For example, the access log providing apparatus may provide a name of an AA bag and a name of a favorite restaurant CC as keywords on the list 411.

In operation 420, the user selects the desired keyword. A portion of the selected keyword is shaded on a list 421. For example, the keyword is selected by inputting the keyword using a mouse and/or a keyboard, in conjunction with a touch recognition method and/or a voice recognition method. For example, the user selects the AA bag from the list 421.

In operation 430, in response to the keyword being selected, the access log providing apparatus searches the database for the keyword and finds information related to a website classified to be in a group corresponding to the keyword. A database 431 stores summary information on the website and address information of the website based on a plurality of keywords. The websites of which similarities are relatively high may be grouped, and a piece of summary information may be stored for each group.

For example, in the database 431, www.AA1.com and www.AA2.com have relatively high similarities due to a word AA and thus, www.AA1.com and www.AA2.com are included in a group 1. Summary information 1 is correspondingly stored. Also, www.CC1.com and www.CC2.com have relatively high similarities due to a word CC and thus, www.CC1.com and www.CC2.com are included in a group 2. Summary information 2 is correspondingly stored. Because same or similar pieces of summary information are not repeatedly provided, the access log providing apparatus may enable the user to perform searching in a simpler manner.

In operation 440, the access log providing apparatus provides the summary information on the retrieved website and the address information of the retrieved website for the user. There may be a plurality of pieces of the summary information on the website and the address information of the website. For example, pieces of address information www.AA1.com and www.AA2.com, corresponding to the name of the AA bag being the keyword selected by the user, as well as the summary information 1 on the websites are displayed on a screen 441 to be provided for the user.

A plurality of groups may be provided and an order in which each group is displayed may be determined based on a priority. The priority may be determined based on a number of websites included in a group or a degree of repetition of content on the websites included in the group. The user may assign a tag indicating that a website is relatively significant, and the priority may be determined based on tag information.

FIG. 5 is a flowchart illustrating an example of providing an access log. In operation 510, an access log providing apparatus obtains a user input for selecting a keyword. The access log providing apparatus may provide at least one keyword stored in a database for a user. Subsequently, the user may generate the user input for selecting the keyword by various methods, for example, using a keyboard, a mouse, a microphone, or a touch sensor.

In operation 520, the access log providing apparatus searches for summary information on an accessed website related to a keyword corresponding to the user input, and address information of the accessed website. The summary information may be generated based on at least one of a word or an image in the website.

In the database, information on a plurality of websites may be correspondingly stored for each keyword based on a plurality of keywords. The information on the website may include summary information on the website and address information of the website. The websites having relatively high similarities with respect to a specified keyword may be included in a same group, and a piece of summary information may correspond to each group.

Thus, the predetermined keyword may be associated with a plurality of groups, and each of the groups may correspond to a relative priority. The priority may be determined based on a number of websites included in a group or a degree of repetition of content in the websites included in the group. The user may assign a tag indicating that a website is relatively significant, and the priority may be determined based on tag information.

In operation 530, the access log providing apparatus displays, on a display, the summary information on the website and the address information of the website. The access log providing apparatus may display, on the display, the summary information on the website related to the keyword corresponding to the user input and the address information of the website related to the keyword corresponding to the user input. Because the keyword is associated with the groups, there may be a plurality of pieces of the summary information on the website and the address information of the website to be displayed. When the keyword is associated with the groups, the summary information on the websites and the address information of the websites included in the groups may be displayed, and the groups may be displayed based on an order of priority.

FIG. 6 is a block diagram illustrating an example of an access log providing apparatus. An access log providing apparatus 600 includes a processor 610, a memory 620 configured to store instructions to be executed by the processor 610, an inputter 630, and a display 640.

The inputter 630 obtains a user input of a keyword. In an example, the inputter 630 includes a keyboard input port or a voice input port. In another example, a keyword to be input is selected, through a touch of a user, from among a plurality of words provided by an access log storing apparatus. In this example the inputter 630 includes a touch sensor.

The memory 620 provides a space in which a database including summary information on a plurality of websites and address information of the websites is stored. The memory 620 stores the instructions to be executed by the processor 610.

The processor 610 performs classifying an access log for each keyword using the instructions stored in the memory 620. The processor 610 obtains the user input for selecting the keyword. The processor 610 searches the database for the summary information on an accessed website related to the keyword corresponding to the user input and the address information of the accessed website. The processor 610 displays, on a display, the summary information on the website and the address information of the website. The summary information may be generated based on at least one of a word or an image in the website.

Examples of illustrated hardware components include controllers, sensors, generators, drivers, and any other electronic components known to one skilled in the art after full understanding of the present disclosure. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one skilled in the art, after full understanding of the present disclosure, that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers skilled in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one skilled in the art, after full understanding of the present disclosure, that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of storing an access log, the method comprising:
    obtaining a keyword based on an input;
    determining a website related to the keyword based on access log information associated with a selected link;
    generating summary information on the determined website using an image processing engine or a natural language processing engine; and
    storing the summary information on the determined website and address information of the determined website in a database,
    wherein the determining of the website related to the keyword comprises classifying websites stored in the access log information based on the keyword and a similarity between the keyword and content on each of the websites,
    wherein the generating of the summary information comprises generating the summary information representing websites which are classified into a group,
    wherein the generating of the summary information comprises generating the summary information which is common among websites of which a similarity is greater than or equal to a threshold value based on an instance of content in the websites related to the keyword, and
    wherein a priority of the determined website is determined based on a degree of repetition of content on the websites included in the group.

2. The method of claim 1, further comprising:
    determining a priority of the determined website.

3. The method of claim 2, wherein the determining of the priority comprises:
    generating a group including websites of which a similarity between content in the websites related to the keyword is greater than or equal to a threshold value; and
    determining a priority of the group based on a number of the websites included in the group.

4. The method of claim 2, wherein the determining of the priority comprises determining the priority based on whether a tag is present on the website related to the keyword.

5. The method of claim 1, wherein the obtaining comprises determining the keyword extracted from the access log information in response to the input.

6. The method of claim 5, wherein the determining of the keyword comprises extracting the keyword based on at least one of a number of websites related to the keyword, an amount of time used for accessing a website as indicated in the access log information, or a number of times the website has been accessed as indicated in the access log information.

7. A non-transitory computer-readable storage medium storing computer-executable instructions that, when executed, cause a processor to perform the method of claim 1.

8. The method of claim 1, wherein the input is input from any one or any combination of a keyboard, a mouse, a touchscreen, or a voice command.

9. The method of claim 2, wherein the determining of the priority comprises:
   generating a group including websites of which a similarity between content in the websites related to the keyword is greater than or equal to a threshold value; and
   determining a priority of the group based on a degree of repetition of content on the websites included in the group.

10. An access log storage apparatus, comprising:
    at least one processor; and
    at least one memory configured to store instructions to be executed by the processor,
    wherein, in response to the instructions being executed by the processor, the instructions cause the processor to obtain a keyword based on an input, determine a website related to the keyword based on access log information associated with a selected link, generate summary information on the determined website using an image processing engine or a natural language processing engine, and store the summary information on the determined website and address information of the determined website in a database,
    wherein the determining of the website related to the keyword comprises classifying websites stored in the access log information based on the keyword and a similarity between the keyword and content on each of the websites,
    wherein the generating of the summary information comprises generating the summary information representing websites which are classified into a group,
    wherein the generating of the summary information comprises generating the summary information which is common among websites of which a similarity is greater than or equal to a threshold value based on an instance of content in the websites related to the keyword, and
    wherein a priority of the determined website is determined based on a degree of repetition of content on the websites included in the group.

11. The apparatus of claim 10, wherein the generating of the summary information comprises generating the summary information using the image processing engine or the natural language processing engine based on at least one instance of content in the determined website.

12. The apparatus of claim 10, wherein the instructions are further configured to cause the processor to determine a priority of the determined website.

13. A processor-implemented method of providing an access log, the method comprising:
    obtaining an input for selecting a keyword;
    searching a database for summary information on an accessed website and address information of the accessed website related to the keyword corresponding to the input; and
    displaying, on a display, the summary information on the website and the address information of the website,
    wherein the summary information is generated based on at least one instance of content in the website using an image processing engine or a natural language processing engine,
    wherein the summary information is generated by classifying websites stored in access log information based on a previous keyword and a similarity between the previous keyword and content on each of the websites, and generating the summary information of a website related to the previous keyword based on a result of the classifying,
    wherein the summary information represents websites which are classified into a group,
    wherein the summary information is generated to be common among websites of which a similarity is greater than or equal to a threshold value based on an instance of content in the websites related to the keyword, and
    wherein a priority of the website is determined based on a degree of repetition of content on the websites included in the group.

14. A non-transitory computer-readable storage medium storing computer-executable instructions that, when executed, cause a processor to perform the method of claim 13.

* * * * *